(No Model.)
E. THOMSON.
SYSTEM OF ELECTRICAL DISTRIBUTION.
No. 428,651. Patented May 27, 1890.
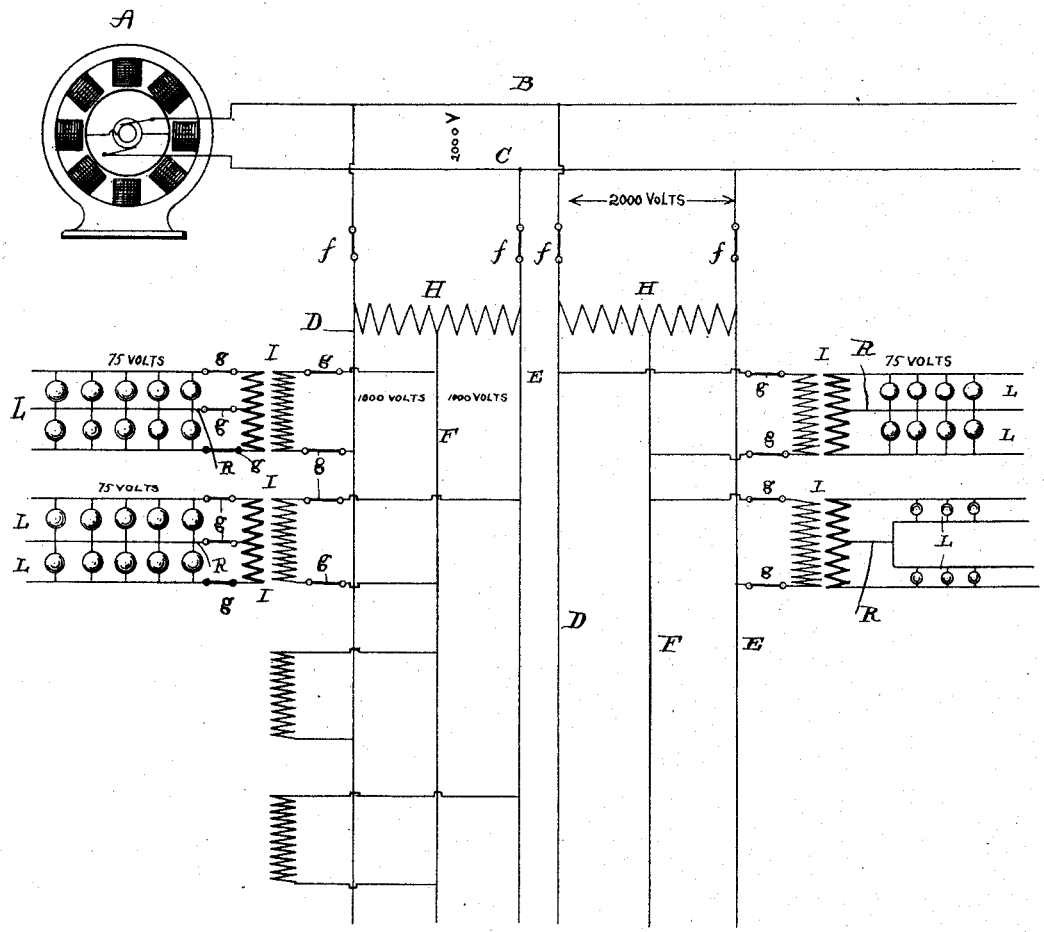
Witnesses
Ira R. Steward
Wm H Capel
Inventor
Elihu Thomson
By his Attorneys
Townsend MacArthur

UNITED STATES PATENT OFFICE.

ELIHU THOMSON, OF LYNN, MASSACHUSETTS.

SYSTEM OF ELECTRICAL DISTRIBUTION.

SPECIFICATION forming part of Letters Patent No. 428,651, dated May 27, 1890.

Application filed August 15, 1888. Serial No. 282,804. (No model.)

*To all whom it may concern:*

Be it known that I, ELIHU THOMSON, a citizen of the United States, and a resident of Lynn, in the county of Essex and State of Massachusetts, have invented a certain new and useful System of Electrical Distribution, of which the following is a specification.

My invention relates to those systems of electric distribution in which alternating electric currents are used upon the main conductor, and in which a compensation for a variation in the number of translating devices in one part of the system is obtained by the employment of one or more electric compensators of any suitable description applied according to the principles of my prior patent, No. 360,125, so as to transfer the excess of energy in one part of the system into energy in the other part or parts where otherwise there might be a decrease.

My invention consists in the system of distribution by alternating currents hereinafter described, in which compensating coils or transfer devices for alternating currents are placed between alternating supply mains, wires, or circuits, and induction-coils or converters of ordinary description for converting currents of high into currents of lower tension are placed with their primaries in the mains or wires leading to the various parts of the compensating coils, as described in my prior patent before referred to.

In the accompanying drawing I have illustrated my improved system diagrammatically.

A indicates any source of alternating electric currents, and B C main conductors or supply-wires leading therefrom. Between these mains at one or more points are connected the coils H, which in the present instance are the compensating reactive coils operating as transfer-coils or energy-transferring devices on a change in the load at a part of the system connected to such coil.

D E are leading-wires connected to the extremes of the compensator H and partaking of the potential of the mains B C, while F is an intermediate leading-wire connected to some intermediate portion of the compensator H, as shown. The point of connection is determined by the load between D and E, as compared with the load between F E. One or more intermediate wires F might be employed.

Between leading-wires D F are connected, in multiple arc or otherwise, one or more induction coils or converters for changing the high tension into lower tension currents, the secondaries of said coils being connected with the translating devices L L, consisting of incandescent lamps or other apparatus. The translating devices are preferably fed in multiple arc or series multiple arc, as clearly indicated, and from one or more intermediate portions of the system run one or more connections R, applied to intermediate portions of the secondaries for the induction-coils I, as shown.

Any number of induction-coils I might be placed in multiple between the mains or leading-wires D F or F E, and similarly any number of sets of translating devices L in multiple arc might be used, the connections to the secondary of the induction-coil or converter being preferably correspondingly increased.

Any variation in the work or load between wires D F or F E, due to variations in the total load upon one or more of the induction-coils I, will be compensated for by the coils H.

Suitable safety devices *f f g g*, consisting of safety fuses or devices adapted to break the connection in the event of overloading of the wires, are placed as shown in the connections to the compensators H and to the coils I. They might also be applied in the connections from the secondaries of said coils.

What I claim as my invention is—

1. In an alternating-current system of distribution, the combination of induction-coils or converters adapted to reduce or modify electric energy, translating devices supplied therefrom, alternating-current mains, compensating or energy-transferring devices connected across said mains, and leads or wires taken to the induction-coils directly from wires or conductors in which the alternating current of said mains flows, as and for the purpose described.

2. An alternating-current system of distribution comprising alternating mains, reactive coils in multiple between the mains, leading-wires connected to various points of said reactive coils, and induction-coils or converters in multiple between said leading-wires and adapted to supply from their secondaries currents of reduced tension to the translating devices.

3. In an alternating system of distribution, alternating mains, reactive coils in multiple between them, leading-wires connected to extreme and intermediate portions of said coils, induction-coils or converters in multiple between said mains, and translating devices in multiple arc between conductors connected to the secondaries of said converters.

4. An alternating-current system of distribution comprising alternating-current mains, compensating coils or transfer devices in multiple between said mains, systems of converters I, having connections to the circuits or wires in which the current of said mains flows, and each having a terminal connected to an intermediate portion of a compensator device, translating devices supplied from the secondaries of the converters I, and connections from intermediate portions of the systems of translating devices to an intermediate portion of the secondary circuit of said converters I.

Signed at Lynn, in the county of Essex and State of Massachusetts, this 13th day of August, A. D. 1888.

ELIHU THOMSON.

Witnesses:
J. W. GIBBONEY,
A. L. ROHRER.